United States Patent
Lampe-Juergens et al.

(10) Patent No.: US 11,499,651 B2
(45) Date of Patent: Nov. 15, 2022

(54) SWITCHLESS VALVE POSITION DETECTION SYSTEM

(71) Applicant: Honeywell International Inc., Morris Plains, NJ (US)

(72) Inventors: Christian Lampe-Juergens, Spelle (DE); Andreas Wuchrer, Georgsmarienhütte (DE); Ralf Schroeder genannt Berghegger, Glandorf (DE); Guido Temme, Bad Iburg (DE); August Wallmeyer, Recke (DE)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 196 days.

(21) Appl. No.: 16/909,802

(22) Filed: Jun. 23, 2020

(65) Prior Publication Data
US 2021/0396331 A1   Dec. 23, 2021

(51) Int. Cl.
*F16K 37/00* (2006.01)
*F16K 31/04* (2006.01)

(52) U.S. Cl.
CPC ........ *F16K 37/0041* (2013.01); *F16K 31/046* (2013.01)

(58) Field of Classification Search
CPC .......................... F16K 37/0041; F16K 31/046
See application file for complete search history.

(56) References Cited

U.S. PATENT DOCUMENTS

| | | | |
|---|---|---|---|
| 5,433,245 A * | 7/1995 | Prather | F16K 37/0083 137/554 |
| 6,064,192 A | 5/2000 | Redmyer | |
| 7,917,314 B2 | 3/2011 | Gilbert et al. | |
| 8,405,383 B2 | 3/2013 | Agrawal et al. | |
| 10,067,168 B2 | 9/2018 | Suchoff | |
| 2011/0267032 A1 | 11/2011 | Zhang et al. | |
| 2016/0369898 A1 | 12/2016 | Waehrisch et al. | |
| 2017/0090004 A1 | 3/2017 | Marshall et al. | |
| 2018/0136258 A1 | 5/2018 | Cook et al. | |

(Continued)

FOREIGN PATENT DOCUMENTS

| | | |
|---|---|---|
| CN | 206096429 U | 4/2017 |
| EP | 2467630 A1 | 6/2012 |

(Continued)

OTHER PUBLICATIONS

"Acuvim II Series Power Meter: User's Manual," AccuEnergy, 2(3): 305 pages, 2015.

(Continued)

*Primary Examiner* — Eric Keasel
(74) *Attorney, Agent, or Firm* — Seager, Tufte & Wickhem, LLP

(57) ABSTRACT

A valve without position indicating switches. Positions of the valve are detected from current magnitude measurements and current profile analytics. The current profile may be learned initially and relearned and adapted at each operation. The valve may be opened and closed by a driver that is actuated by an electrical current to control the opening and closing of the valve. The current may be regulated by a controller to open and close the valve appropriately.

19 Claims, 16 Drawing Sheets

(56) References Cited

U.S. PATENT DOCUMENTS

2019/0226601 A1    7/2019  Feng et al.

FOREIGN PATENT DOCUMENTS

JP          2017194142 A     10/2017
WO     WO-2018000033 A1 *   1/2018  .............. F01N 1/16

OTHER PUBLICATIONS

Csanyi, "Basic three-phase power measurements explained," IAEI News Magazine, 9 pages, May 16, 2017.
"3-Phase-Power Meter," PCE Instruments, pp. 216-218, downloaded Feb. 20, 2019.
"Power Indicator PCE-ND30: User's Manual," PCE Instruments, 64 pages, downloaded Feb. 20, 2019.
"Meter Of Network Parameters ND10 Type: User's Manual," PCE Instruments, 51 pages, downloaded Feb. 20, 2019.
"Extremely powerful 3-phase energy meter," Quibino, 18 pages, downloaded Feb. 20, 2019.
"Near-field communication," Wikipedia, 15 pages, last edited Feb. 11, 2019.
"BK-G4 Meter," Honeywell, 2 pages, accessed Sep. 24, 2020.
"BK-G4 an BK-G4T," Elster, 2 pages, 2012.
Extended European Search Report, EP Application No. 21180479.4, dated Nov. 11, 2021 (9 pages).

\* cited by examiner

SWITCHLESS VALVE POSITION DETECTION SYSTEM

BACKGROUND

The present disclosure pertains to valves and control of valves.

SUMMARY

The disclosure reveals a valve without position indicating switches. Positions of the valve are detected from current magnitude measurements and current profile analytics. The current profile can be initially learned and relearned and adapted with each valve operation. The valve may be opened and closed by a driver that is actuated by an electrical current to control the opening and closing of the valve. The current may be regulated by a controller to open and close the valve appropriately.

BRIEF DESCRIPTION OF THE DRAWING

FIG. 9 is a diagram showing a current consumption curve separated into several areas and corridors;

DESCRIPTION

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

Figure 1:
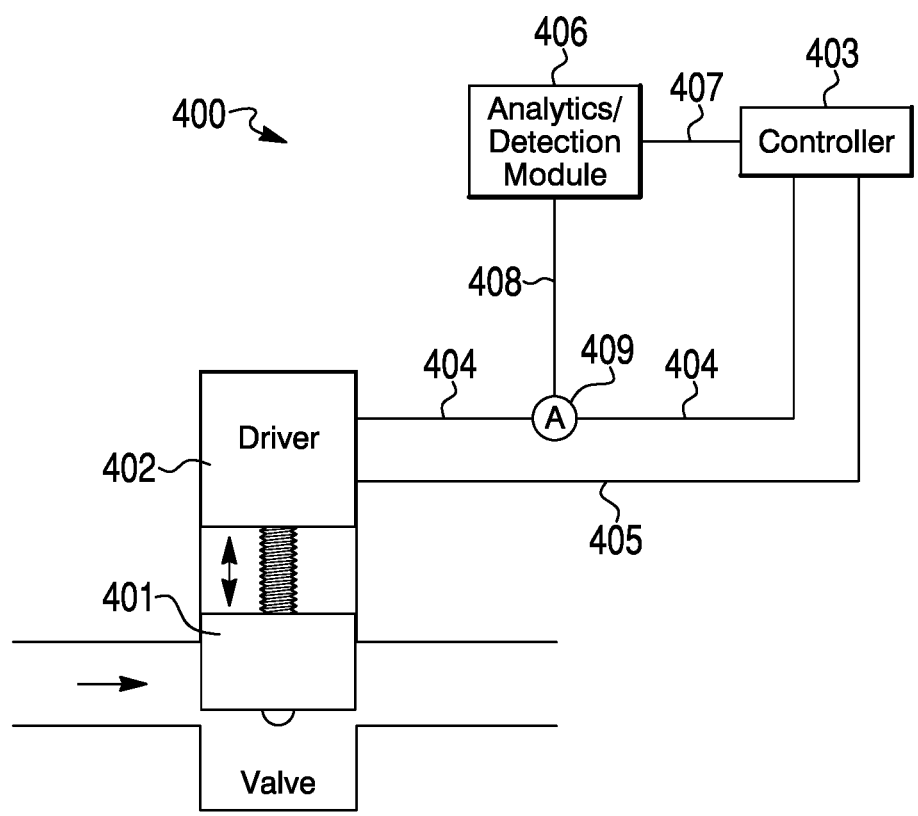
FIG. 1 is a diagram of a basic switchless valve control system.

FIG. 1 is a basic diagram of a switchless valve control system 400. There may be a valve 401 that is opened and closed by an electric valve moving driver 402. A controller 403 may provide power via lines 404 and 405 to driver 402. An ampere meter 409 may be connected in series with line 404 or is part of the controller 403. Meter 409 may have an output to a detection and/or analytics module 406 via connection 408 of a waveform of magnitude of current provided to driver 402. The detection and/or analytics module 406 can be also part of the controller 403. From the waveform, detection module 406 can determine whether the valve is opening, is open, closing, is closed, or is at an intermediate position. Determinations of valve activity may be sent by detection module 406 via a connection 407 to controller 403 so as to provide appropriate control of valve 401 with current control via lines 404 and 405 to driver 402. Connections 407 and 408 may be wired or wireless. Controller 403 may incorporate a user interface. In other words, present system 400 may detect valve positions, opened and closed, without switches by current measurement of, for example, a valve motor, and by driving the valve to a defined block position.

A software algorithm, which is parameterized to new valve performance of current and time, may have a learning algorithm in that these valve parameters can be adapted to later ageing and dust effects. This adaption may be done smoothly to avoid the learning of failure modes. The system may remain robust for voltage and temperature differences and can detect abnormal tamper or blocking conditions.

The current measurement may be done by existing components with the micro of the electronic index and so achieving a significant cost reduction by removing the switches from the printed circuit board assembly (PCBA) appears feasible.

Within the scope of the cost reduction, one may minimize the material costs of the system. The challenge minimizing the current valve version development is to recognize the valve position as well as the further possible states by the physical signals like time, current, voltage with the goal to remove the end position switches. As minimum requirement is to recognize the end positions, i.e., open and closed.

A straight forward solution may be to detect the end position on a steep threshold of a current waveform. But this kind of detection alone may not be enough, because with respect to all known additional situations like ageing, tampering, environmental conditions, and so on, one needs to adapt a decision with maximum objectivity in comparison to a proper solution with the end position detectors realized by the hardware (HW), that provides geometrical position knowledge independent of the environmental conditions, tampering, and so on. Data generated or captured may include current values derived from opening or closing a valve by a microelectronic assembly.

A specification may show a valve module with a driver interface and no additional digital positioning detectors. The valve state may be recognized from physical characteristics detected by a software (SW) module in a microcontroller (uC). The present system is to recognize a valve position as well as the further possible states by the physical signals like time, current, voltage with a goal to remove the end position switches. The system may recognize the end positions open and closed. The system may detect an end position on the steep threshold of the current. But this alone may not be enough, because with respect to all known additional situations like ageing, tampering, environmental conditions, and so on, it may adapt a decision with maximum objectivity in comparison to a proper solution with the end position detectors realized by the hardware (HW), that can provide geometrical position knowledge in dependence of the environmental conditions, tampering, and so forth.

One may need to act with a specific driver variant, and to track very sensitively the valve current during operation. The valve position and interaction time may play a secondary role. However, the driver function may provide robust and clear diagnostic information.

Production steps to be taken in account may be as follows. 1) The index HW may be flashed and rebooted without the connected valve. 2) In the next step, the valve with a physically unknown position may be connected to the Index. 3) At this step, it should be needed to execute the learning procedure, with the goal to learn the valve HW parameters as well as bring the valve into a defined position. 4) The leakage test may be executed. The valve position may be expected to be in the open state as a default state.

The learning phase may have an initial connection the valve HW to the main board of the index or driver box HW. In this case, the driver HW does not necessarily have any knowledge about the current valve position following some initial actions, or calibration steps.

The simplest action needed for the initialization may be a "feeling" of the closing position and measurement of the operational mechanical distance over the time during the additional opening phase. As soon the "closed" end position is reached, the opening transition may be initiated. By driving up to the physical end position, the operation time may be tracked and stored as the initial operational time. This may be used to adapt the operational parameters in the field depending on the ageing processes. The learning phase for production and final in field operation options may be a little bit different in the sensitivity and diagnostic behavior. However, there may be an exchange of the configuration by changing some of the key parameters of the driver.

The learning process may self-implement two significant phases. In the first phase, the driver may try to detect a proof end position for a close state. In this phase, the operational time, up to this threshold may be irrelevant. The firmware may drive the valve as soon the maximum current consumption is detected. An error may state that can happen here in that there is only the "time_out" for an operation.

As soon the "close" end position is reached the driver may start the moving in the opposite direction and measure the opening time until the hard current threshold is detected. The measured opening time may be used as initializer for opening and closing observer variables. The new learned behavior parameters may be immediately valid and can be stored in the non-volatile memory.

Figure 2:
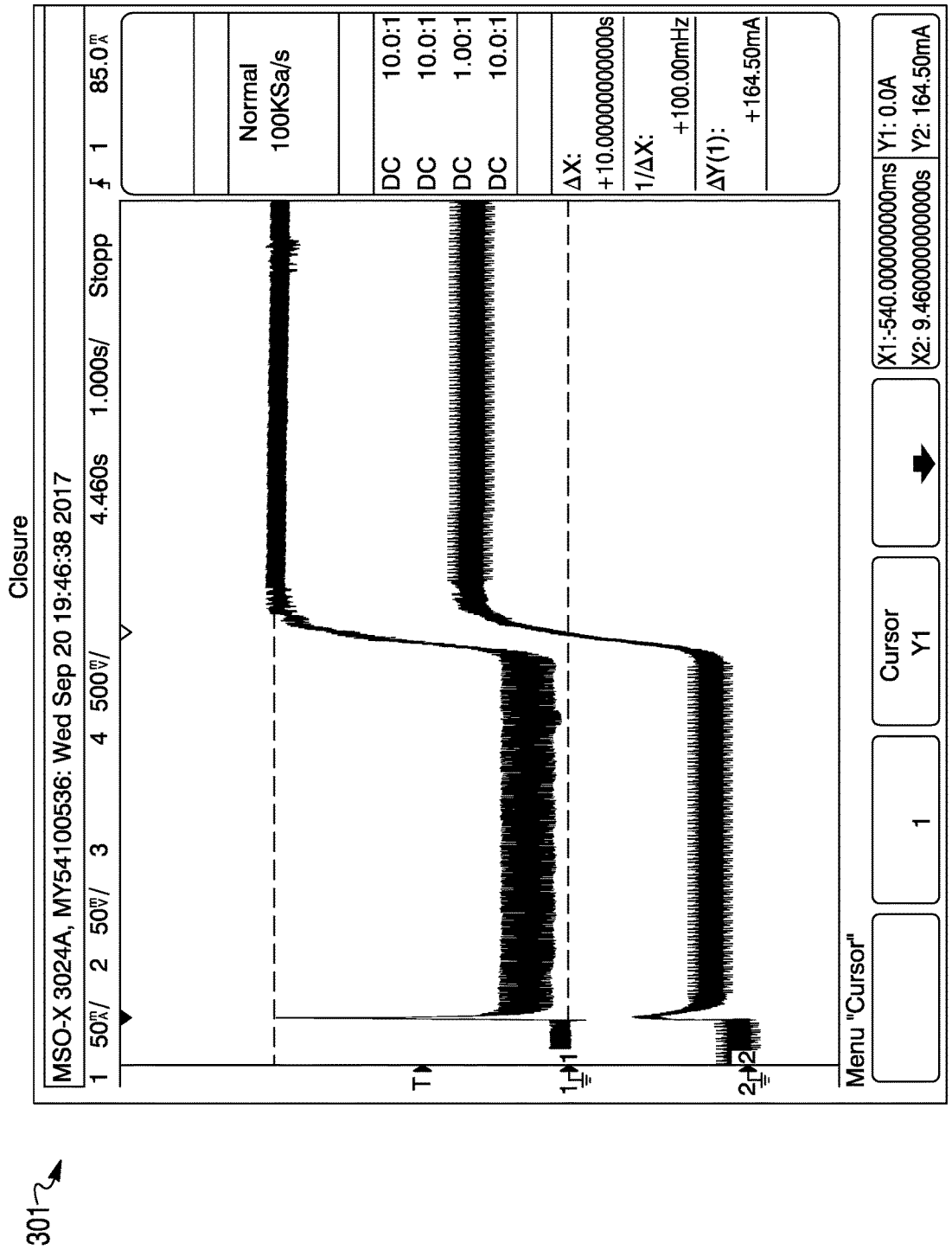
FIG. 2 is a diagram of an example trace of a valve closure.

A typical current profile of a closing transition may have the following behavior during the closing transition as it is important to recognize the rapid current jump in any case as soon as possible for proper recognition of the end position and immediately stopping the movement if an issue is detected of gas flow detection. FIG. 2 may be noted as an example trace 301 of a valve closure.

Figure 3:
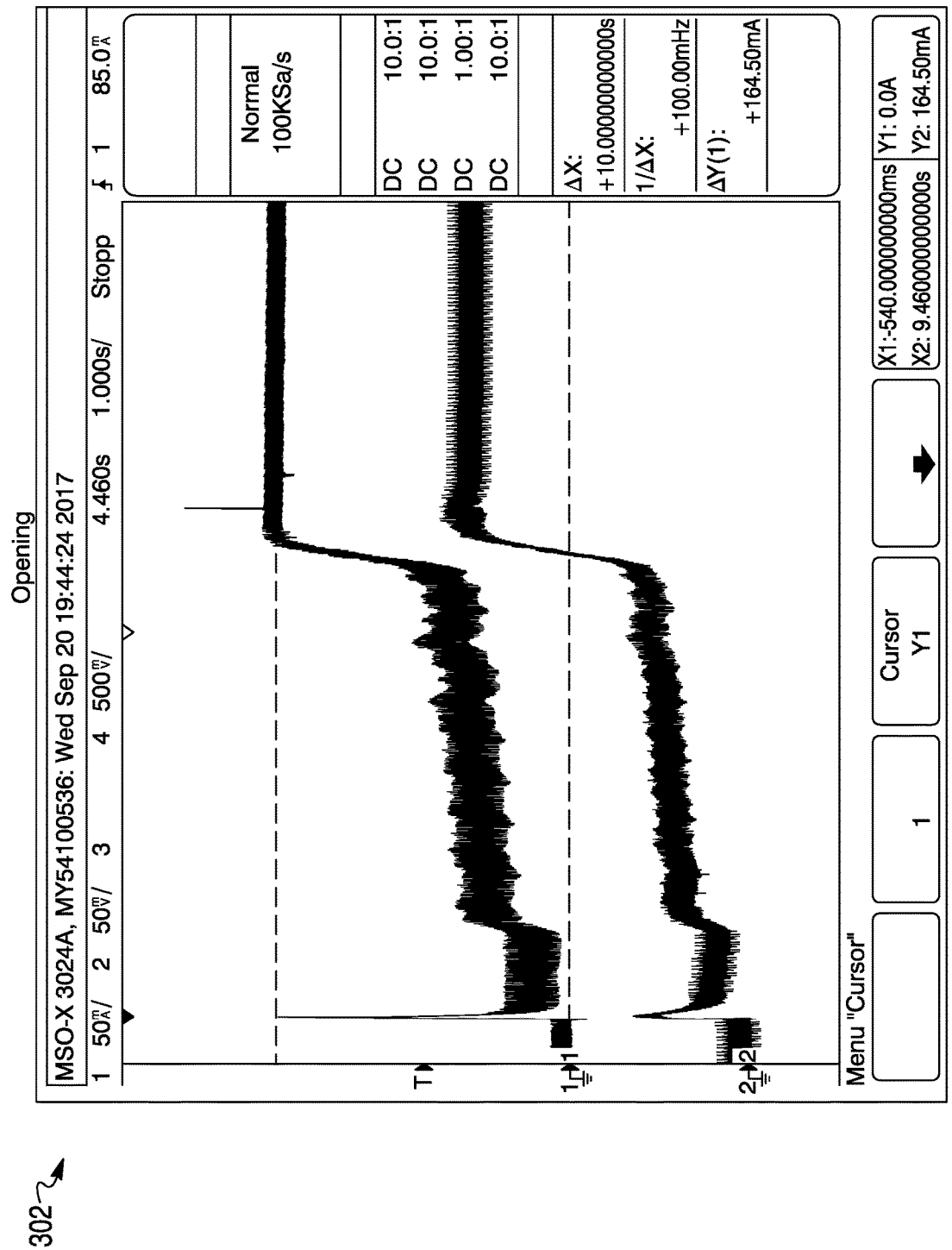
FIG. 3 is a diagram of an example trace of a valve during an opening transition.

A typical current profile of the opening transition may have a picture as in FIG. 3 of an example trace 302 of a valve during an opening transition. It is important to recognize the rapid current jump at any case as soon as possible in recognition of an end position within a ten percent tolerance in case of an issue while trying a closing or opening the valve.

Figure 4:
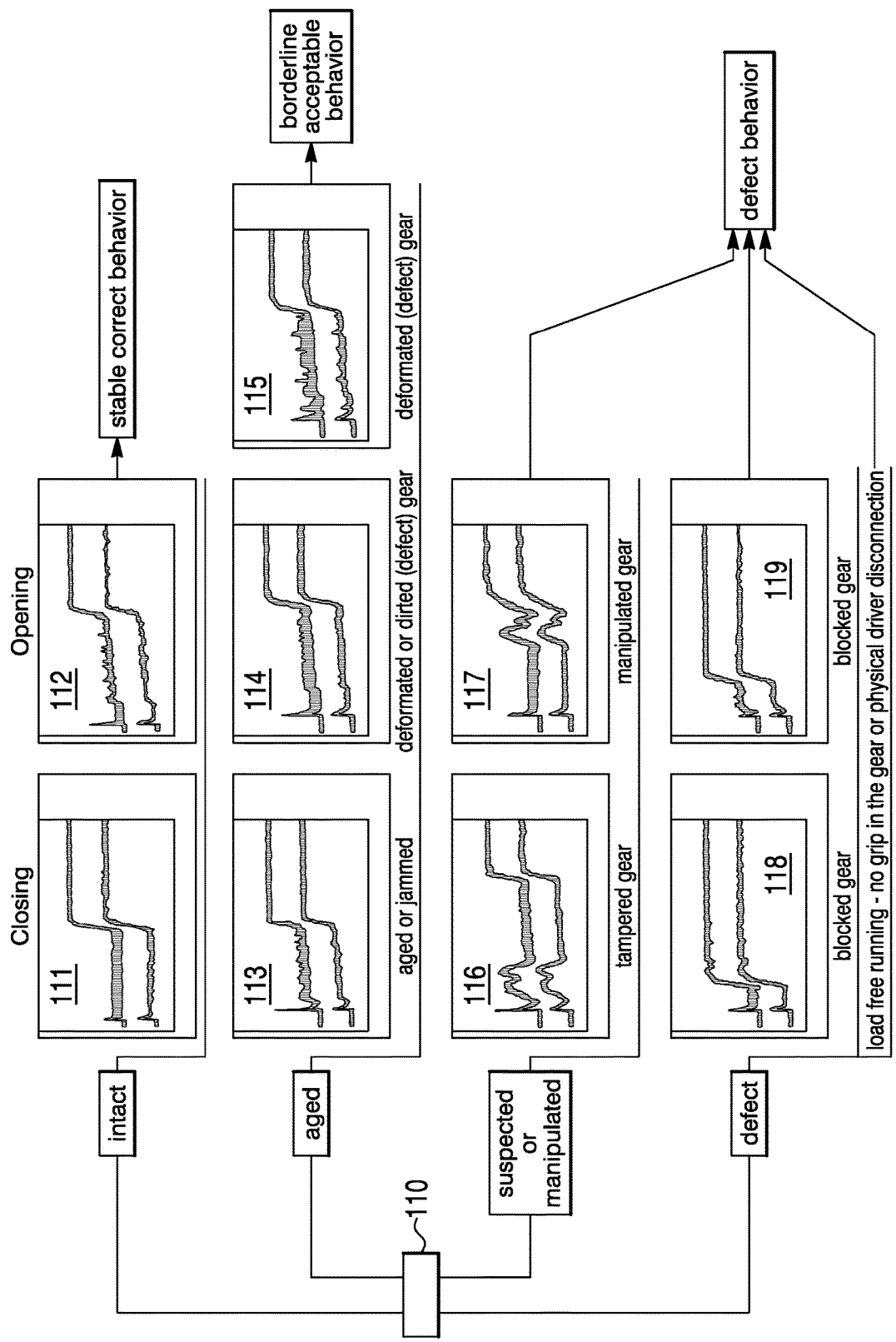
FIG. 4 is a diagram of signal waveforms of various functions of a driver.

FIG. 4 is a diagram of various functional samples. With respect to safety and mechanical requirements, an optimal solution may be to implement an algorithm with end position detection on the raised current threshold at a closing stage and with a valve driver stopping on the estimated position during an opening transition. The diagram may provide a rough overview of expected states of a valve from a beginning of manufacturing up to functioning in the field with or without an impact of tampering or ageing.

Signal waveforms of a driver 110 are shown in FIG. 4. Waveforms 111 show valve closing and waveforms 112 show a valve opening in view of stable correct behavior. Signal waveforms 113 show an aged or jammed function; and waveforms 114 show deformed or dirtied (defect) gear. Waveforms 115 show a deformed (defect) gear. Waveforms 113, 114 and 115 may have borderline acceptable behavior. Waveforms 116 are suspected of a tampered valve. Waveforms 117 are suspected of a manipulated valve. Waveforms 118 and 119 indicate a blocked valve revealing defective behavior. There may be load free running, that is, no grip in the gear, or a physical driver disconnection.

Figure 5:
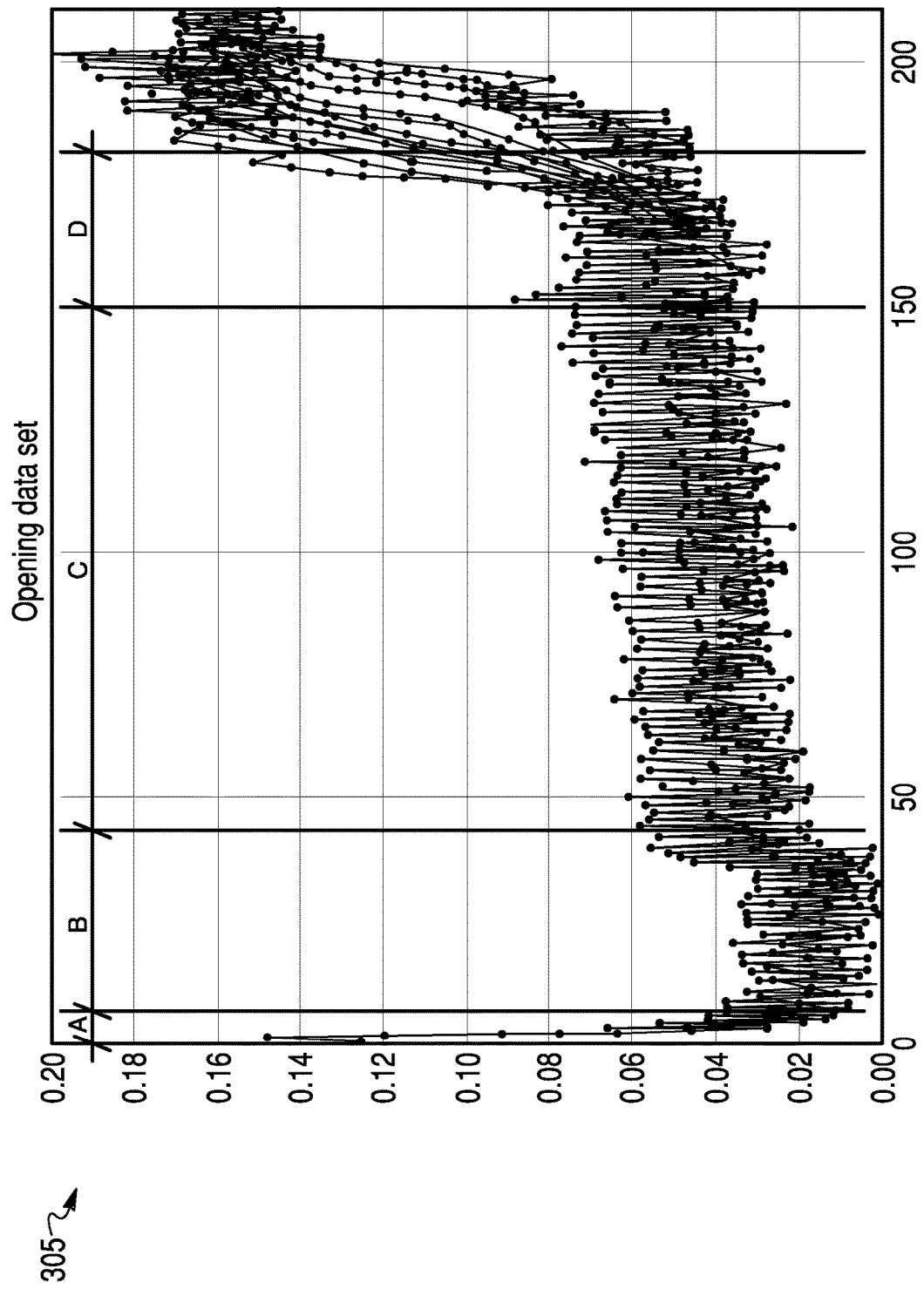
FIG. 5 is a diagram of a data set for an opening phase of a valve.

The following discussion may show a typical current profile for opening and closing actions taken on a test bench without the typical gas pressure. For the opening phase, an opening data set 305 shown in FIG. 5 reveals the following significant process stages: Stage A) initial inertia overcoming; Stage B) tolerance compensation—the driver is running nearly without the load; Stage C) spring compressing—the effective mechanical moving phase—the current is bit higher under real pressure conditions; and Stage D) end compression against the physical border.

Figure 6:
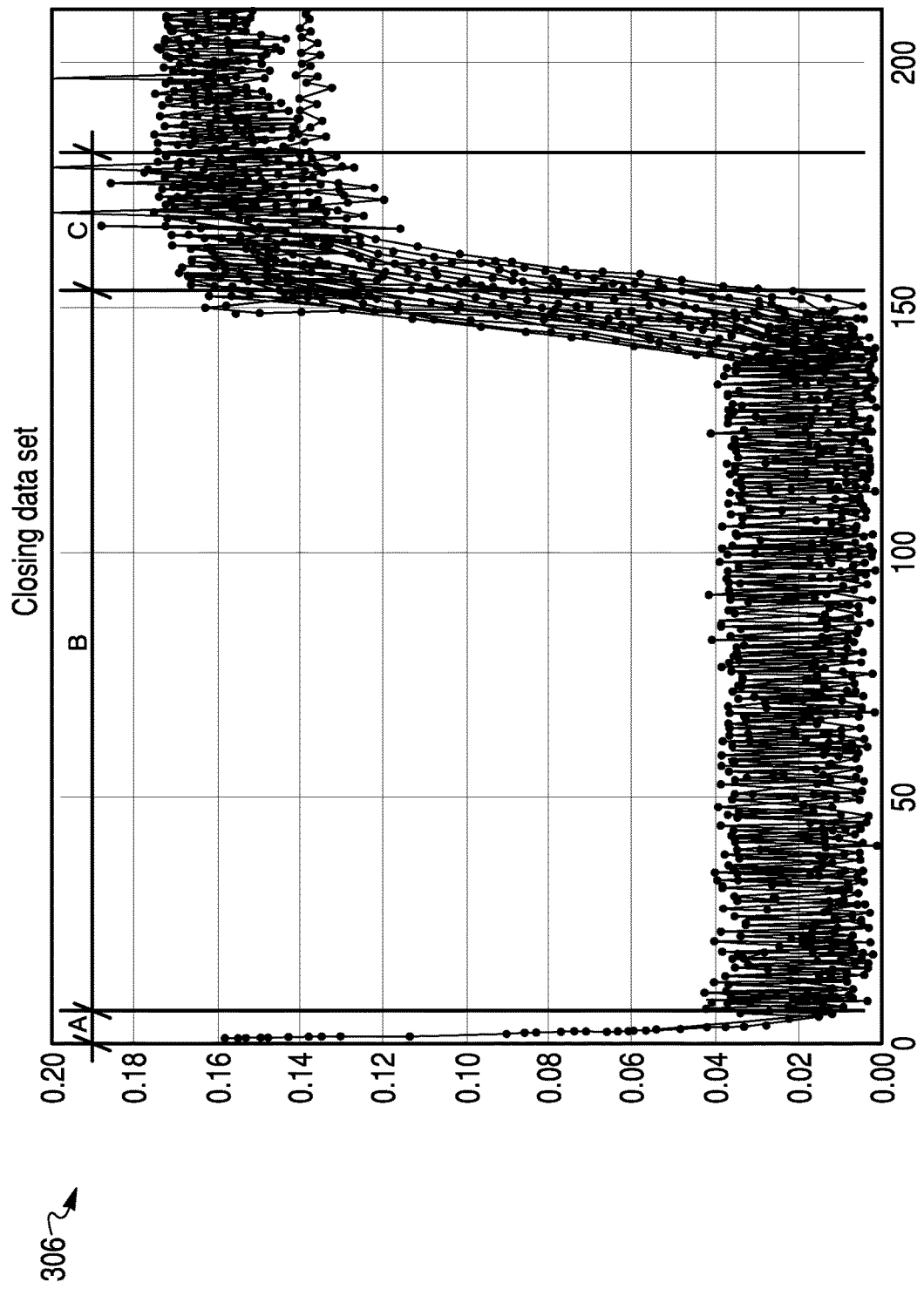
FIG. 6 is a diagram of a data set for a closing phase of the valve.

For the closing phase, a closing data set 306 in FIG. 6 reveals the following significant process stages: Stage A) initial inertia overcoming; Stage B) closing phase with support of the gas pressure and spring force—The driver is running nearly without the load; and Stage C) end compression against the physical border.

Figure 7:
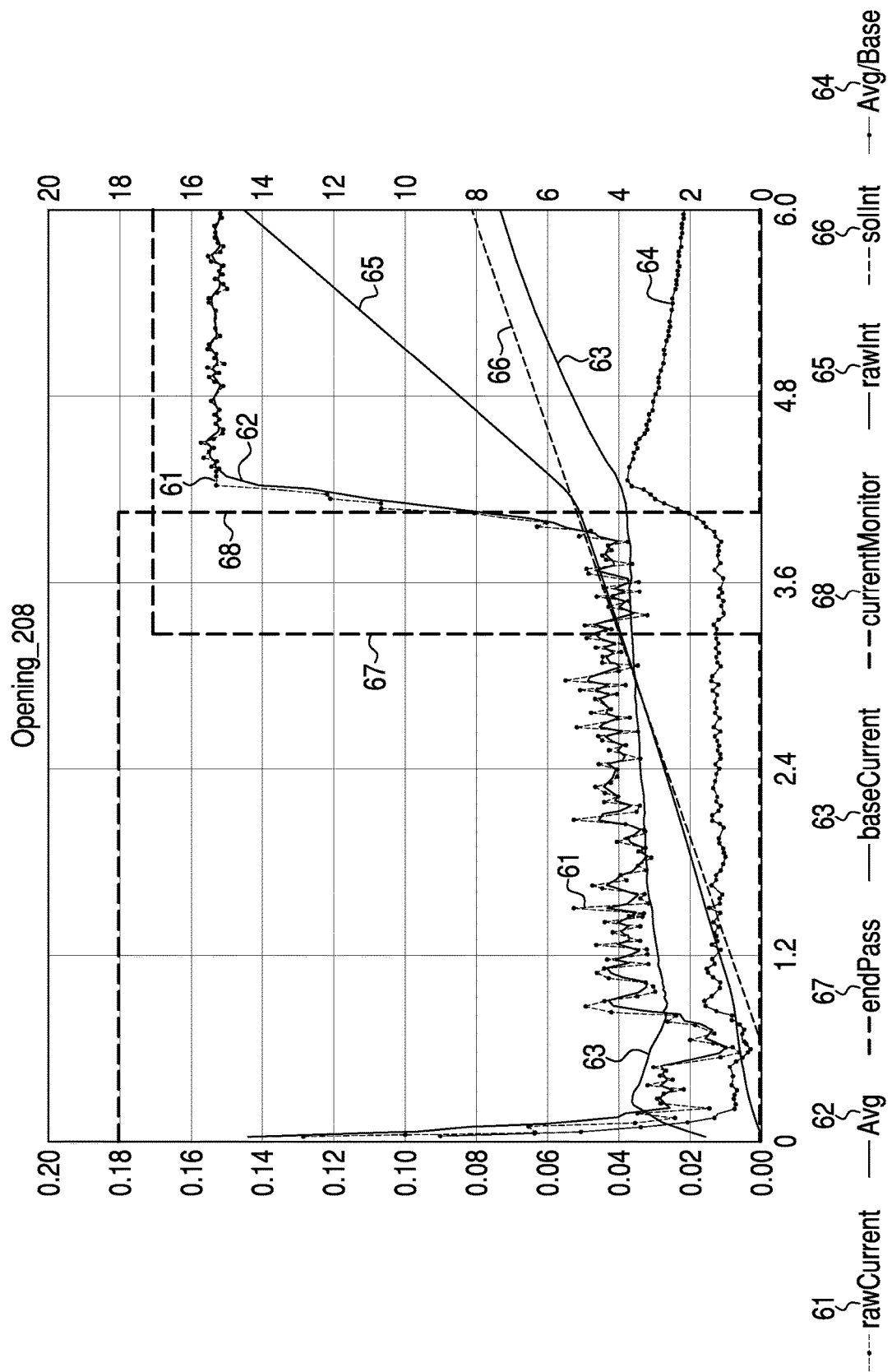
FIG. 7 is a diagram of signals of various states of current to the driver.

FIG. 7 is a diagram of signals designated as: raw current 61—the raw measured current value without any filter; avg 62—current average value (discrete low pass filter); base current 63—the geometrical average value build from the start point of the measurement; avg/base 64—the ratio between the current raw measured and the base current values; raw int 65—the integrated raw current value; soil int 66—the estimated energy consumption from the "golden device"; end pos 67—raised threshold indicates the estimated action end position; and current monitor 68—detection of the mechanical end position on the driver current threshold.

Figure 8:
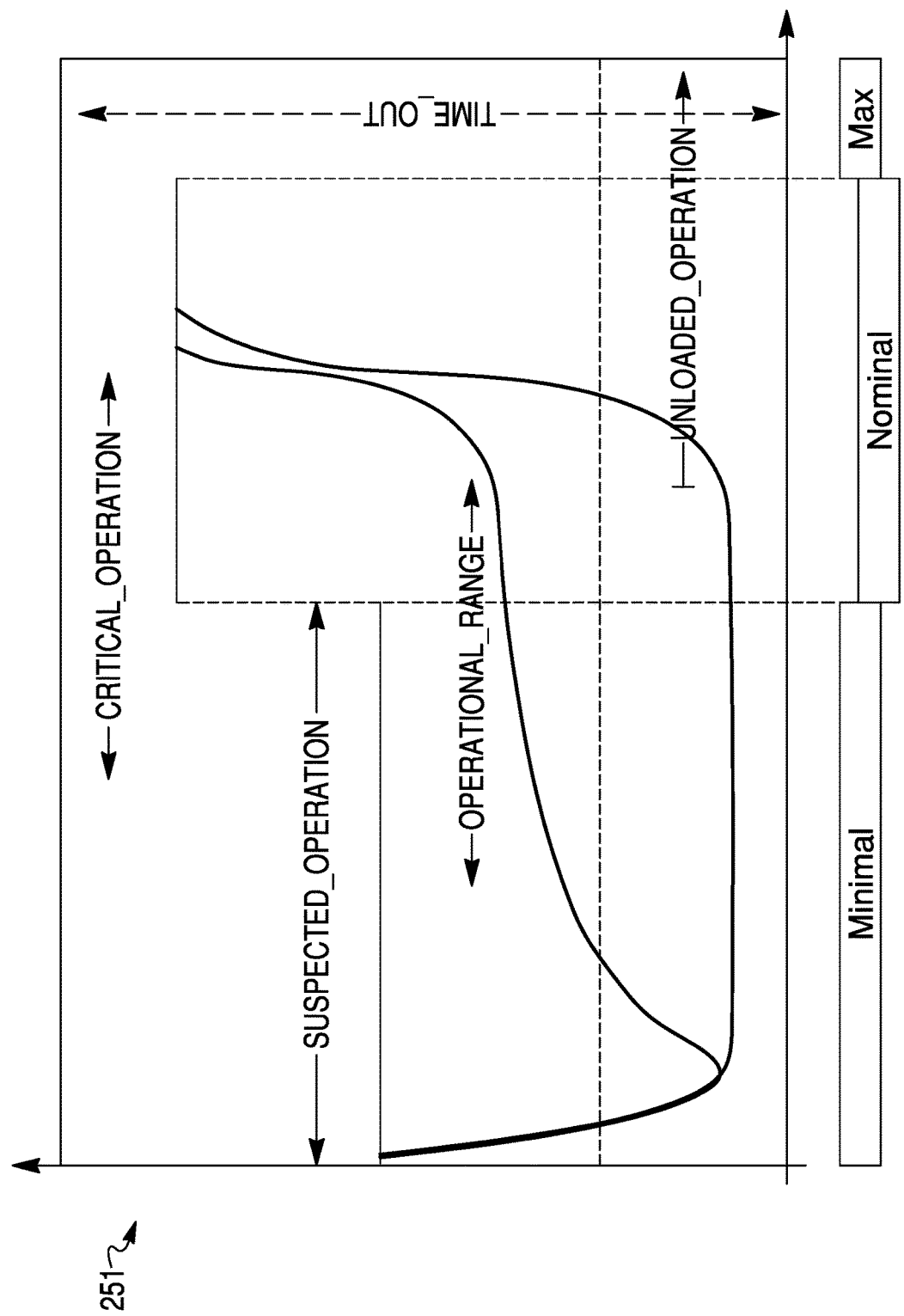
FIGS. 8 and 9 are diagrams of basic profiles of current magnitude monitored by a controller.

A basic profile should be monitored by the controller which may be simplified by a diagram in FIG. 8, which is a diagram 251 showing a basic profile as monitored by a controller. There are two main parts of the valve component. One is an application part—valve_app. It may implement global logical interactions. A main idea is a safe releasing control and diagnostic management. Another part, a driver valve—valve_drv, may provide a piece of code for direct hardware control.

Figure 9:
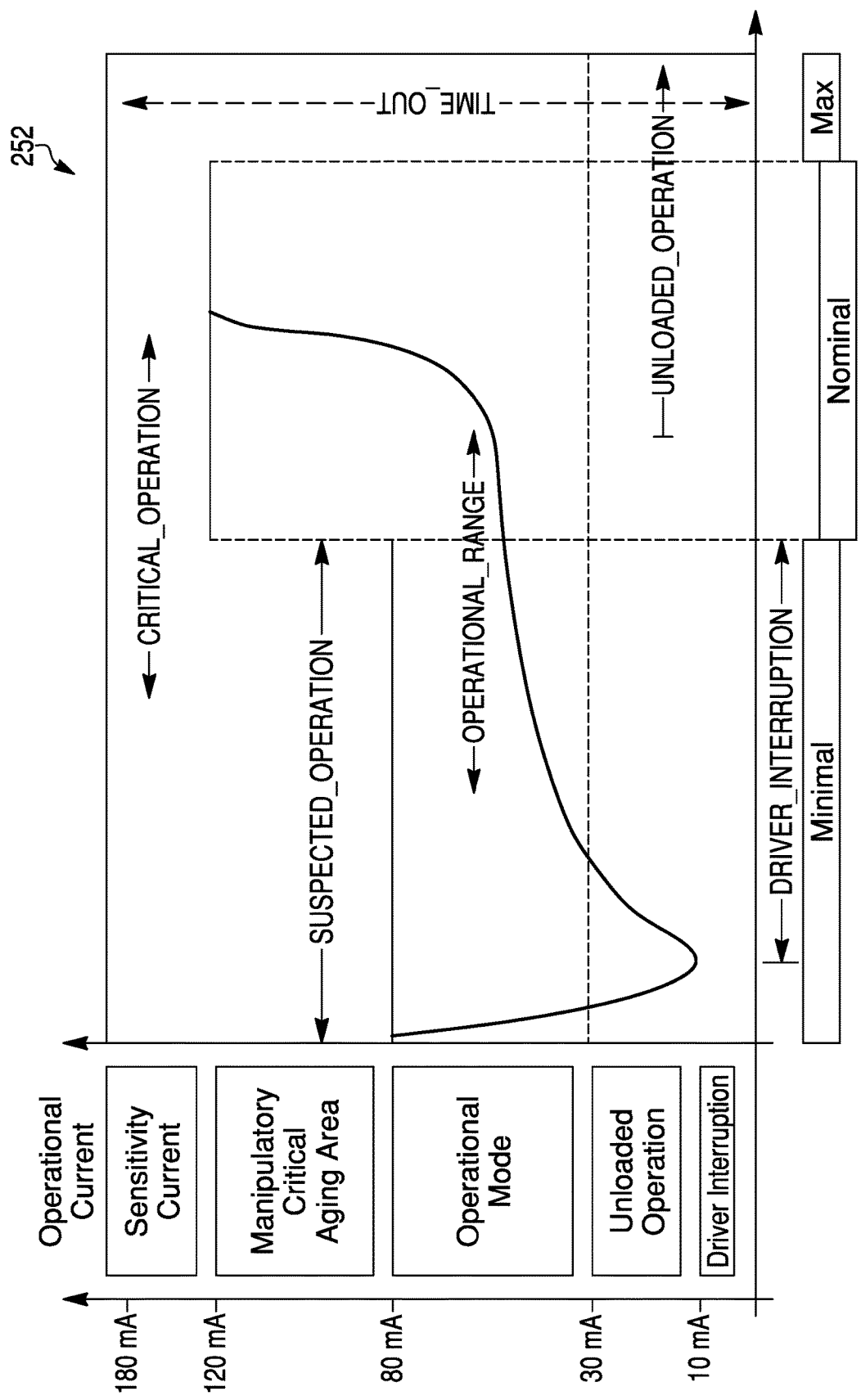

FIG. 9 is a diagram 252 showing a current consumption curve separated into several areas and corridors. The areas may be defined by an electrical current consumption value in dependency to a time related window. A middle area may indicate a nominal operational pattern. Any deviations of the corridor may lead to a related error log entry.

Figure 10:
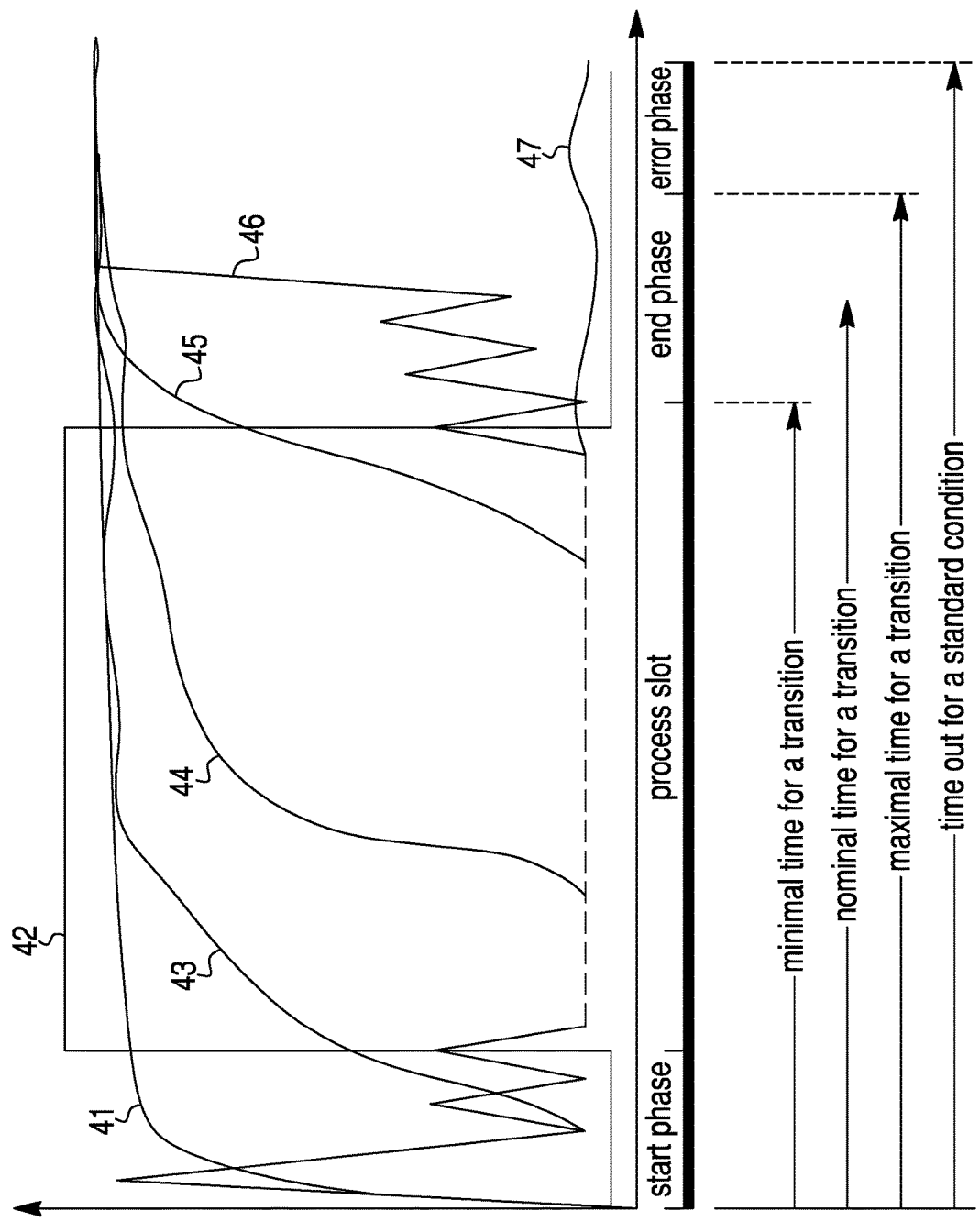
FIG. 10 is a diagram of several scenarios during a valve interaction.

The driver may be a simple current observer only. For a final decision, the current consumption information may be associated with related time information. FIG. 10 may provide several scenarios during a valve interaction. A curve 46 may show a typical current flow by an intact valve hardware. A curve 42 may mark a typical position detection by a valve with end position detection. So 41st, 43rd, 44th and 45th lines may present several tampering or jamming conditions. Last but not least the curve 47 may provide an unloaded driver operation. With respect to the current valve approach as well as the typical current profile (line 46), an interaction process call may be divided into the following sections on the lower portion of FIG. 10. At a starting phase, a motor may start the driving. At a process slot, the whole opening or closing job may be executed. At an end phase, the time window within the abrupt raised current threshold, as an indication by the border, may be detected. At an error phase may be a time-out without the expected high current measurement as an indication of damage or an unexpected condition. With a goal to provide a full service logic, a detection algorithm may provide additional intelligence.

Figure 11:
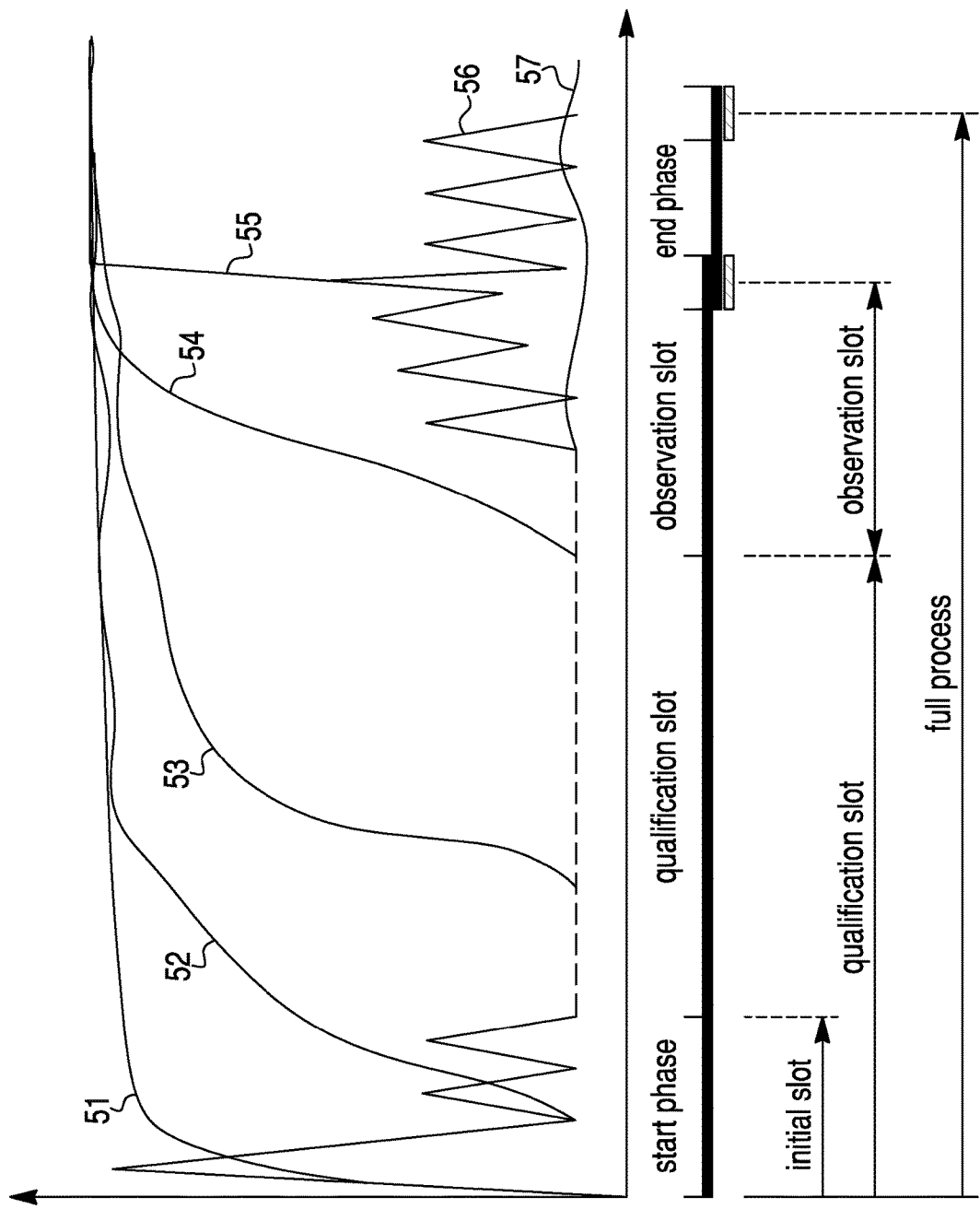
FIG. 11 is a diagram of curves of a typical current flow by intact valve hardware.

The driver may implement some additional services to diagnose the valve state as well as manipulation attacks. Similar to a previous minimal implementation concept, a diagram of FIG. 11 may provide curves 55 and 56 as a typical current flow by an intact valve hardware. The 51st, 52nd, 53rd and 54 lines may present several tampering or jamming conditions. Lastly, a curve 57 may provide an unloaded driver operation.

A valve driver may implement the observation slots and following diagnostic functions. At a start slot, the motor may start the driving, and the current profile may be monitored. In case of an unexpected high current consumption, this may provide an indication of damage/blockage. At the end of the start slot, a first significant correction point may be recorded. At a qualification slot, current progress may be monitored. In case of an unexpected high current consumption, there may an indication of blockage/tampering. At the end of the qualification slot, the second control point may be recorded. A comparison between first and second control points may provide information regarding the whole hardware "feeling". So the effort value at the second point may provide knowledge and a following correction factor for the following stage. This may also estimate an end time of the border event. An observation slot within the time window may allow detection of an abrupt raised current threshold. This event may be logged as a "transition successful". The process may be successfully stopped with a logged message of "driver stopped".

The whole operational time may be separated into three slots: [MIN_TIME, NOM_TIME, and MAX_TIME]. The minimal time window: MIN_TIME may define the slot within no high consumption to be expected. If high current is detected, it may be a hint of possible ageing, manipulation or mechanical damage of the valve. In any case, this will be logged and stored into the log memory. Inside the nominal time window: NOM_TIME, the expected end position may be measured. The window may be more or less dynamic and be adapted at every close or open action separately. At the time point of MAX_TIME, the driver activity may be switched off, because this may be outside the expected "usual" process area. A related log event may be generated.

Learning logic may be noted. As soon the firmware is flashed into the uC and reboots, the valve driver may take the state UNKNOWN independent of the real valve connection. The model does not necessarily expect any parametrization. The index may receive further commands for closing or opening and execute this but without proper state management. From this point on are existing two possibilities to provide proper operation to the valve driver. One may execute the learning process by writing a valve model configuration option to the HARDWARE_INFO object. This may be done at every time (for execution conditions that refer to the object implementation, and for instance takes up to 20 sec. in the execution) or, second, execute the open—close cycle for more such as four times. In this case, the driver may measure the HW conditions and learn that it is over several cycles for a stable operation. After successful execution of the recommended procedure (i) or (ii), the state may be stored into the nonvolatile memory and be used for a specified operation.

The learning process may self-implement two significant phases or states. In the first state, the driver may try to detect a proof end position for a close state. In this phase or state, the operational time, up to this threshold may be irrelevant. The firmware may drive the valve as soon as the max current consumption is detected. The error state that may happen here, is only the "time_out" for operation. As soon the "close" end position is reached, the driver may start moving in the opposite direction and measure the opening time until the hard current threshold is detected. The measured opening time may be used as an initializer for opening and closing observer variables. The new learned behavior parameters may be immediately valid and be stored in the nonvolatile memory.

The new learned operational time may be adopted for the next opening and closing processes. The last learned "finger print' may be found in the VALVE_DRV_SETUP_CONTROL. This time may be directly coupled to the environmental conditions (operation under gas pressure or operation under an unloaded condition). The last means to rush condition change may lead to unwanted side effects and error events.

Figure 12:
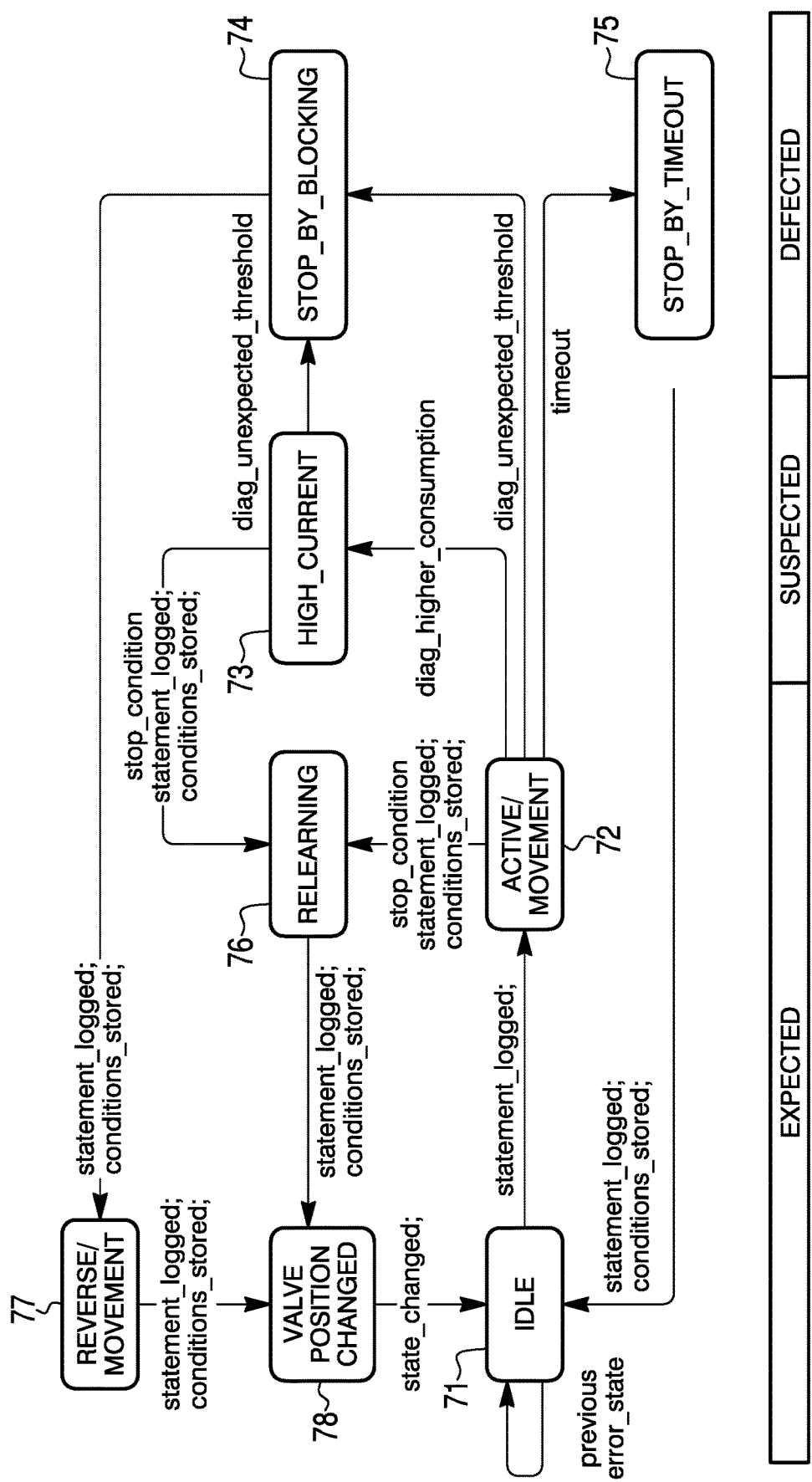
FIG. 12 is a diagram of a driver process with signals going from one functional block to another for opening and closing a valve.

FIG. 12 is a flow diagram of a driver process with signals going from one functional block to another for opening and closing a valve. An idle block 71 may incorporate a "previous error_state". A "statement_logged" may go from block 71 to an active/movement block 72. A "diag_higher_consumption" may go from block 72 to a high_current block 73. A "diag_unexpected_threshold" may go from block 72 to a stop_by_blocking block 74. A "timeout" may go from block 72 to a stop_by_timeout block 75. A "stop_condition; statement_logged_conditons_stored;" may go from block 72 to a relearning block 76. A "diag_unexpected_threshold" may go from block 73 to block 74. A "stop_condition; statement_logged conditions_stored;" may go from block 73 to block 76. A "diag_unexpected_threshold" may be from block 73 to block 74. A "statement_logged; conditions_stored;" may go from block 74 to a reverse movement block 77. A "statement_logged; conditions_stored;" may go from block 75 to block 71. A "statement_logged; conditions stored;" may go from block 76 to a valve position changed block 78. A "statement_logged; conditions stored; may go from block 77 to block 78. A "state changed;" may go from block 78 to block 71.

Figure 13:
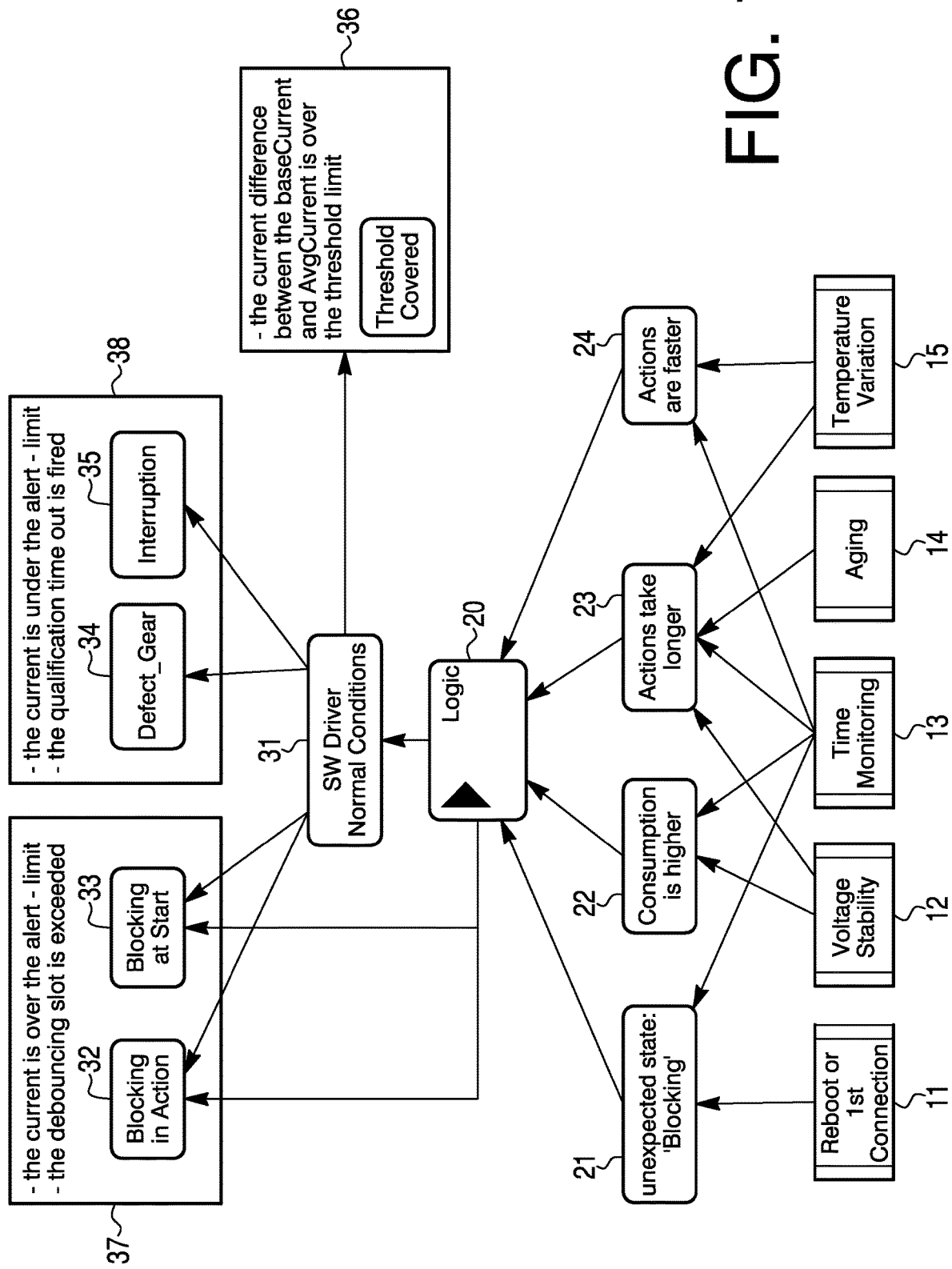
FIG. 13 is a diagram of a logic schematic for the driver and valve system operation.

FIG. 13 is a diagram of a logic schematic. A block 11 may show a "reboot or $1^{st}$ connection" to a block 21 entitled "unexpected state 'blocking'". A "voltage stability" block 12 may show a connection to a block 22 entitled "consumption is higher" and to a block 23 entitled "actions take longer". A block 13 may show a "time monitoring" connected to block 21 entitled "unexpected state 'blocking', block 22 "consumption is higher", block 23 entitled "actions take longer", and a block 24 entitled "actions are faster". A block 14 may show "aging" connected to block 23 entitled "actions take longer". A block 15 may show "temperature variation" connected to block 23 entitled "actions take longer" and block 24 entitled "actions are faster". Block 21 entitled "unexpected state 'blocking'", block 22 entitled "consumption is higher", block 23 entitled "actions take longer" and block 24 entitled "actions are faster" have outputs connected to a "logic" block 20.

An output from "logic" block 20 may go to a "SW driver normal conditions" block 31, which may have outputs to a "blocking in action" block 32, "blocking at start" block 33, "defect_gear" block 34, and "interruption" block 35. Connections directly from "logic" block 20 may go directly to "blocking in action" block 32 and "blocking at start" block 33. Another output from "SW driver normal conditions" block 31 may go to a block 36 where the current difference between the base current and average current is over a threshold limit. Block 36 may indicate the threshold as covered.

A block 37, encompassing blocks 32 and 33, may indicate a current is over the alert-limit and a debouncing slot is exceeded. A block 38, encompassing block 34 and block 35, may indicate the current is under the alert-limit and a qualification time out is fired.

Figure 14:
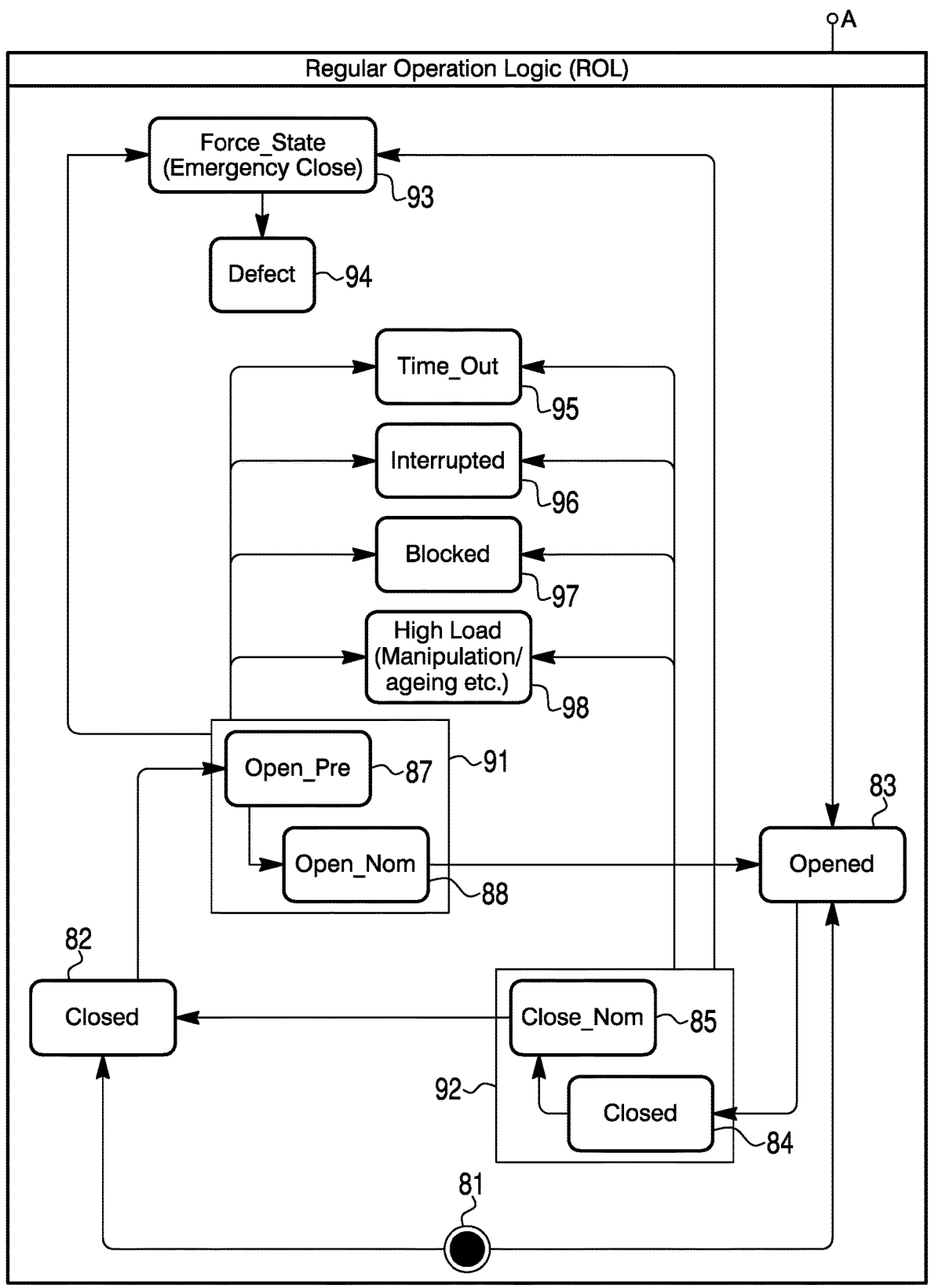
FIG. 14 is a diagram of regular operation logic for regular valve open/close processing.

FIG. 14 is a diagram of regular operation logic for regular open/close processing. A start may begin at symbol 81 which can provide a signal to a closed symbol 82 and/or opened symbol 83. A signal may go to opened symbol 83. A signal may go from symbol 83 to a close_pre symbol 84 which in turn may provide a signal to close_nom 85. From symbol 85 a signal may go to closed symbol 82. A signal may go from symbol 82 to open_presymbol 87. To an open_nom symbol 88 may a signal be from symbol 87. From symbol 88, a signal may go to an opened symbol 83.

A block 91 that contains symbol 87 and symbol 88, may provide a signal to a force_state (emergency close) symbol 93. A block 92 that contains symbol 84 and symbol 85, may send a signal to symbol 93. From symbol 93 a signal may go to a defect symbol 94.

A signal from block 92 may go to a time_out symbol 95, interrupted symbol 96, blocked signal 97 and high load (manipulation/aging/and so on) symbol 98. A signal from block 91 may also go to symbol 95, symbol 96, symbol 97 and symbol 98.

Figure 15:
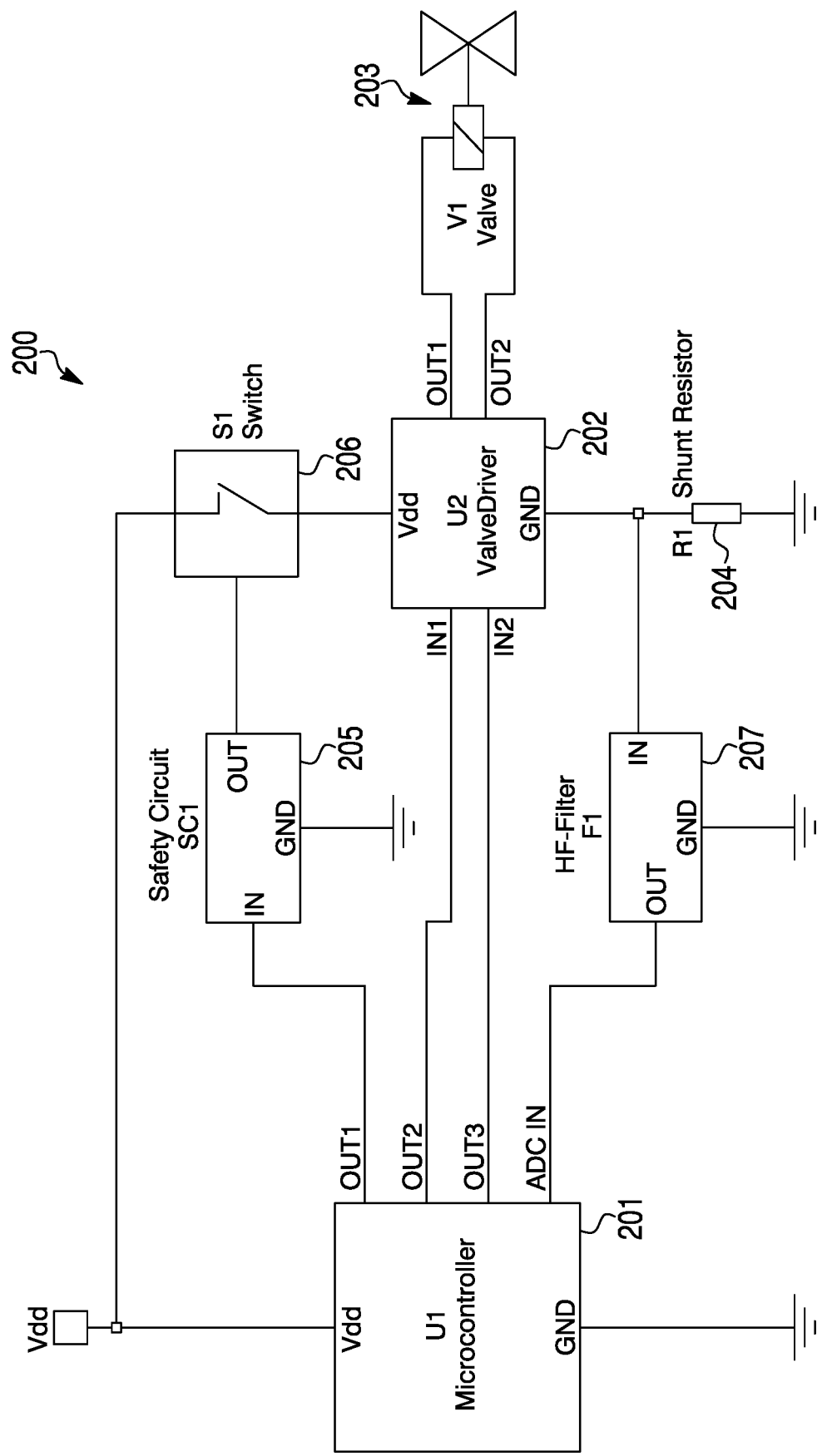
FIG. 15 is a diagram of valve system electronics.

FIG. 15 is a block diagram 200 of valve control electronics. The microcontroller U1 201 controls the valve driver U2 202 via IN1 and IN2 of the valve driver. IN1 and IN2 have high impedance, so the current in these pins is very low compared to the valve current to valve 203 from OUT1 and OUT2 of valve driver 202. Thus, the current consumption of the valve driver 202 is very low compared to the current consumptions of valve 203. The valve driver 202 controls the valve 203 via OUT1 and OUT2. Valve driver 202 pins OUT1 and OUT2 can have a high or low voltage. The valve driver 202 can control the direction of the motor of valve 203 by applying positive or negative voltage to the valve 203 motor. The valve current goes through the GND pin of the valve driver 202 and the shunt resistor 204. The voltage drop at resistor 204 is proportional to the absolute value of the valve current. The microcontroller 201 measures the voltage drop at resistor 204 with its analog to digital converter via the ADC_IN pin of microcontroller 201. The ADC_IN pin has high impedance, so the current at this pin is very small compared to the valve 203 current. To enable the valve driver circuit 202, the microcontroller 201 sends a signal to the safety circuit 205. The safety circuit 205 controls the switch 206. The valve 203 can be operated only when the switch 206 is activated. This switch 206 prevents operation of the valve 203 in case of a failure. The HF-filter 207 filters high frequency noise from the shunt voltage across resistor 204. This improves the accuracy of the ADC measurements at ADC IN of microcontroller 201.

Figure 16C:
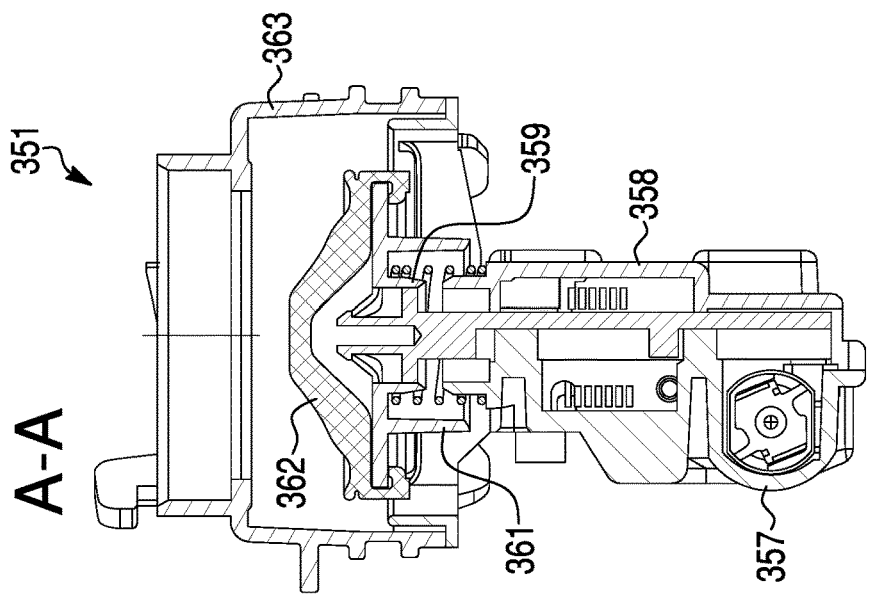
FIGS. 16A-16C are diagrams of various aspects of an illustrative example of a valve structure.
Figure 16B:
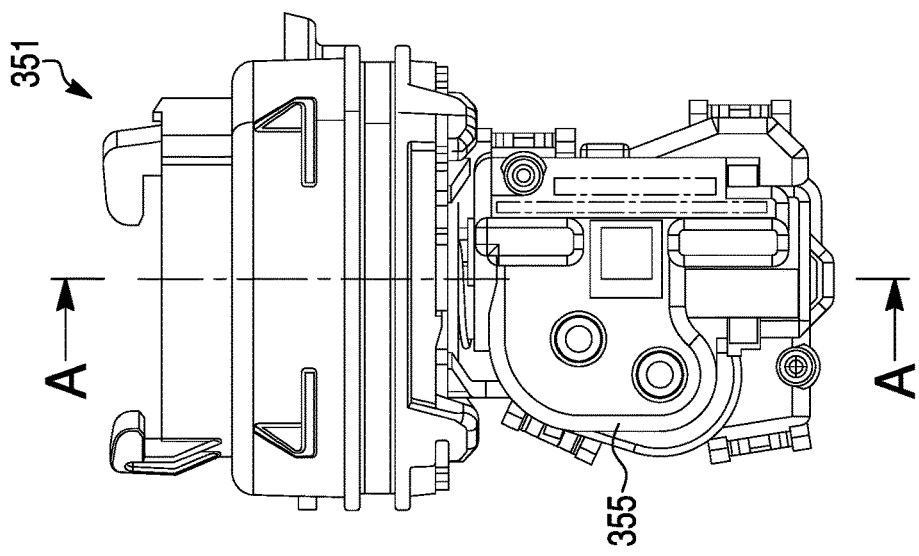
Figure 16A:
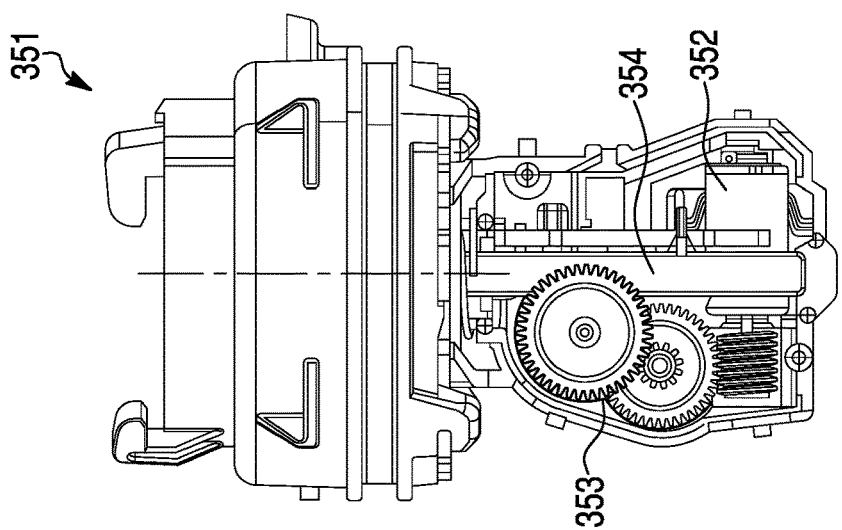

FIG. 16A is a diagram of an illustrative example present valve assembly 351. The diagram reveals a motor 352, gears 353 and gear rack 354. FIG. 16B shows valve assembly 351 with a protective cover 355. Also shown are locations of cutaways at positions A-A and B-B. FIG. 16C is an A-A cutaway view of assembly 351. The view reveals a valve housing 357, valve cover 358, spring 359, valve disk 361, valve gasket 362 and valve body 363.

To recap, a switchless valve control system may incorporate a driver for a mechanical connection to a valve and be configured to change a position of the valve, a controller electrically connected to the driver and be configured to electrically cause the driver to change the position of the valve, and a current sensor electrically connected to the driver so as to detect a profile of current from the controller in terms of magnitude going to the driver, to indicate a position of the valve.

The system may further incorporate an analytics or detection module connected to or is a part of the controller, and connected to an output of the current sensor. The analytics module may identify a closing of the valve and an opening of the valve from the profile of current detected by the current sensor.

For initialization, a sensing of a closing and measurement of an operational mechanical distance overtime may occur during an additional opening phase of the valve.

As soon as a closed position is reached, an opening transition may be initiated. As soon as an open position is reached, a closing transition may be initiated. By driving up a physical end position, an operation time may be tracked and stored as an initial operation time.

The initial operation time may be for adapting operational parameters of the driver.

A valve position driver apparatus may incorporate a valve driver, a controller having a power output for the valve driver, and a sensor connected to the controller for detecting current of the power output. The controller may detect closure and opening of a valve according to a magnitude of current provided to the valve driver system.

The controller may be effected with a learning process.

In a first phase, the driver may detect a proof end position for a closed state. The controller may cause the driver to move a valve as soon as a maximum of current consumption is detected. As soon as a closed end position is reached, the driver may start moving the valve in an opposite direction and measure an opening time until a threshold is detected. As soon as an open end position is reached, the driver may start moving the valve in an opposite direction and measure a closing time until a threshold is detected.

By detection of an open position, a measured opening time may be used as an initializer for opening and closing observer variables.

Newly learned behavior parameters may be validated and stored in a non-volatile memory.

A time of operation may incorporate multiple slots. The multiple slots may include a minimal time window, a nominal time window and a maximum time window.

The minimal time window may define a slot where current consumption is abnormal, and if current higher or lower than normal in the slot is detected, then a problem with the valve may be noted and stored in a memory. The nominal time window may define a slot where a normal expected end position is measured and adapted at each close or open action. The maximum time window may define a slot where the driver is switched off since a duration of the slot is outside a normal process.

A valve control mechanism may incorporate a valve driver, a controller connected to the valve driver, and a current meter connected in-line between the controller and the valve driver. The current meter may have an output indicating current magnitude, connected to the controller. The valve driver may be connected to a valve and configured to open and close the valve. A current profile of the current magnitude of current used to power the valve driver, may indicate openness and closure of the valve, or a physical condition of the valve.

Detecting a closing transition of the valve according to the current profile may include recognition of a rapid current jump and of an end position in detecting an opening transition according to the current profile that includes recognition of an end position. Detecting an opening transition of the valve according to the current profile may include recognition of a rapid current jump and of an end position in detecting a closing transition according to the current profile that includes recognition of an end position.

A start slot may be when a motor of the valve driver starts driving the valve, while the current profile is monitored.

The mechanism may further incorporate a device configured to record consumption of current, connected to the controller. An unusual amount of consumption of current may indicate a functional discrepancy with the valve. The device may record a first control point of the unusual amount of consumption of current.

A qualification slot may involve monitoring a progress of the current consumption and noting higher than usual current consumption at an end of the qualification slot. The device may record a second control point of the higher than usual current consumption.

A comparison of the first and second control points may provide information leading to a correction factor for controlling the valve.

An observation slot may have a time window which is allowed detection of an abrupt raised current threshold, an event that is logged in as a transition successful and provides information about a whole process that is used for a relearning operation in controlling the valve.

New measured process data may be used at least partially as a calibration for the next action for controlling the valve.

Any publication or patent document noted herein may hereby be incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A switchless valve control system comprising:
   a driver for a mechanical connection to a valve and configured to change a positioning of the valve;
   a controller electrically connected to the driver and configured to electrically cause the driver to change the positioning of the valve;
   a current sensor electrically connected to the driver so as to detect a profile of current from the controller in terms of magnitude going to the driver, to indicate a position of the valve; and
   memory in communication with the current sensor; and
   wherein an amount of current provided to the driver can indicate a functional discrepancy with the valve; and
   wherein a first control point of the amount of current provided to the driver indicating the functional discrepancy with the valve is recorded in the memory.

2. The system of claim 1, further comprising:
   an analytics module connected to or as a part of the controller, and being connected to an output of the current sensor; and
   wherein the analytics module identifies a closing of the valve and an opening of the valve from the profile of current detected by the current sensor.

3. The system of claim 2, wherein the controller, for initialization, is configured to sense a closing and measurement of an operational mechanical distance over_time during an additional opening phase of the valve.

4. The system of claim 3, wherein the controller is configured to:
   initiate, as soon as a closed position is reached, an opening transition;
   initiate, as soon as an open position is reached, a closing transition; and
   while driving up a physical end position, track an operation time and store the tracked operation time as an initial operation time.

5. The system of claim 4, wherein the initial operation time is for adapting operational parameters of the driver.

6. A valve position driver apparatus comprising:
   a valve driver;
   a controller having a power output for the valve driver; and
   a sensor connected to the controller for detecting current of the power output; and
   memory in communication with the sensor; and
   wherein the controller detects closure and opening of a valve according to a magnitude of current provided to the valve driver;
   wherein an amount of current provided to the valve driver can indicate a functional discrepancy with the valve; and
   wherein a control point of the amount of current provided to the valve driver indicating the functional discrepancy with the valve is recorded in the memory.

7. The apparatus of claim 6, wherein the controller is configured to effect a learning process to identify newly learned behavior parameters.

8. The apparatus of claim 7, wherein the learning process comprises:
   when in a first phase, the driver detects a proof end position for a closed state;
   the controller causes the driver to move a valve as soon as a maximum of current consumption is detected;
   as soon as a closed end position is reached, the driver starts moving the valve in an opposite direction and measures an opening time until a threshold is detected; and
   as soon as an open end position is reached, the driver starts moving the valve in an opposite direction and measures a closing time until a threshold is detected.

9. The apparatus of claim 8 wherein by detection of an open position, the controller is configured to use a measured opening time as an initializer for opening and closing observer variables.

10. The apparatus of claim 8, wherein the controller is configured to validate the newly learned behavior parameters and store the validated newly learned behavior parameters in a non-volatile memory.

11. The apparatus of claim 10, wherein:
    a time of operation incorporates multiple slots; and the multiple slots include a minimal time window, a nominal time window and a maximum time window.

12. The apparatus of claim 11, wherein:
the minimal time window defines a slot where current consumption is abnormal, and if current higher or lower than normal in the slot is detected, then a problem with the valve is noted and stored in a memory;
the nominal time window defines a slot where a normal expected end position is measured and adapted at each close or open action; and
the maximum time window defines a slot where the driver is switched off since a duration of the slot is outside a normal process.

13. A valve control mechanism comprising:
a valve driver;
a controller connected to the valve driver; and
a current meter connected in-line between the controller and the valve driver;
a device configured to record consumption of current, the device is connected to the controller; and
wherein:
the current meter has an output indicating current magnitude, connected to the controller;
the valve driver is connected to a valve and configured to open and close the valve; and
a current profile of the current magnitude of current used to power the valve driver, indicates openness and closure of the valve, or a physical condition of the valve;
an amount of consumption of current can indicate a functional discrepancy with the valve; and
the device records a first control point of the amount of consumption of current indicating the functional discrepancy with the valve.

14. The mechanism of claim 13, wherein the controller is configured to detect a closing transition of the valve according to the current profile and detect an opening transition according to the current profile and:
detecting the closing transition of the valve according to the current profile includes recognition of a current jump and of an end position in detecting an opening transition according to the current profile that includes recognition of an end position; and
detecting the opening transition of the valve according to the current profile includes recognition of a current jump and of an end position in detecting a closing transition according to the current profile that includes recognition of an end position.

15. The mechanism of claim 14, wherein a start slot is when a motor of the valve driver starts driving the valve, while the current profile is monitored.

16. The mechanism of claim 13, wherein:
a qualification slot involves monitoring a progress of the current consumption and noting higher than average current consumption at an end of the qualification slot; and
the device records a second control point of the higher than average current consumption.

17. The mechanism of claim 16, wherein a comparison of the first and second control points provides information leading to a correction factor for controlling the valve.

18. The mechanism of claim 13, wherein an observation slot has a time window which allows detection of a rise in current above a threshold, wherein the controller is configured to log an event of the rise in current above the threshold as a transition successful.

19. The mechanism of claim 18, wherein new measured process data are used at least partially as a calibration for the next action for controlling the valve.

* * * * *